United States Patent
Feiten et al.

(10) Patent No.: US 11,106,196 B2
(45) Date of Patent: Aug. 31, 2021

(54) METHOD AND APPARATUS FOR SHAPING A PRODUCTION PROCESS FOR PRODUCING A PRODUCT MADE UP OF MULTIPLE SUBPRODUCTS

(71) Applicant: SIEMENS AKTIENGESELLSCHAFT, Munich (DE)

(72) Inventors: Wendelin Feiten, Neubiberg (DE); Sebastian Albrecht, Hallbergmoos (DE)

(73) Assignee: SIEMENS AKTIENGESELLSCHAFT

( * ) Notice: Subject to any disclaimer, the term of this patent is extended or adjusted under 35 U.S.C. 154(b) by 108 days.

(21) Appl. No.: 16/310,700

(22) PCT Filed: May 26, 2017

(86) PCT No.: PCT/EP2017/062735
§ 371 (c)(1),
(2) Date: Dec. 17, 2018

(87) PCT Pub. No.: WO2018/001650
PCT Pub. Date: Jan. 4, 2018

(65) Prior Publication Data
US 2019/0129393 A1    May 2, 2019

(30) Foreign Application Priority Data

Jun. 28, 2016   (DE) .................. 10 2016 211 554.5

(51) Int. Cl.
*G05B 19/418* (2006.01)
(52) U.S. Cl.
CPC ... *G05B 19/41865* (2013.01); *G05B 19/4188* (2013.01); *G05B 2219/31053* (2013.01); *G05B 2219/32107* (2013.01); *Y02P 90/02* (2015.11)

(58) Field of Classification Search
CPC .......... G05B 19/41865; G05B 19/4188; G05B 2219/31053; G05B 2219/32107; Y02P 90/04; Y02P 90/20; Y02P 90/24
See application file for complete search history.

(56) References Cited

U.S. PATENT DOCUMENTS

| 5,523,960 A | 6/1996 | Jeong |
| 6,157,902 A | 12/2000 | Hirata et al. |

(Continued)

FOREIGN PATENT DOCUMENTS

| CN | 101256492 A | 9/2008 |
| CN | 203102354 U | 7/2013 |

(Continued)

OTHER PUBLICATIONS

PCT International Search Report corresponding to PCT International Application No. PCT/EP2017/062735.

(Continued)

*Primary Examiner* — Yuhui R Pan
(74) *Attorney, Agent, or Firm* — Schmeiser, Olsen & Watts LLP

(57) ABSTRACT

A method and also an associated computer program (product) and an apparatus for shaping a production process for producing a product made up of multiple subproducts in a production system having multiple production modules is provided. The claimed method has the following steps: generating a process model using data about production steps to be carried out for the product and the subproducts thereof, from which process model at least some of the data about at least one production step are read and a respective production module that is available and associated for carrying out the respective production step is ascertained (Continued)

Figure 1:
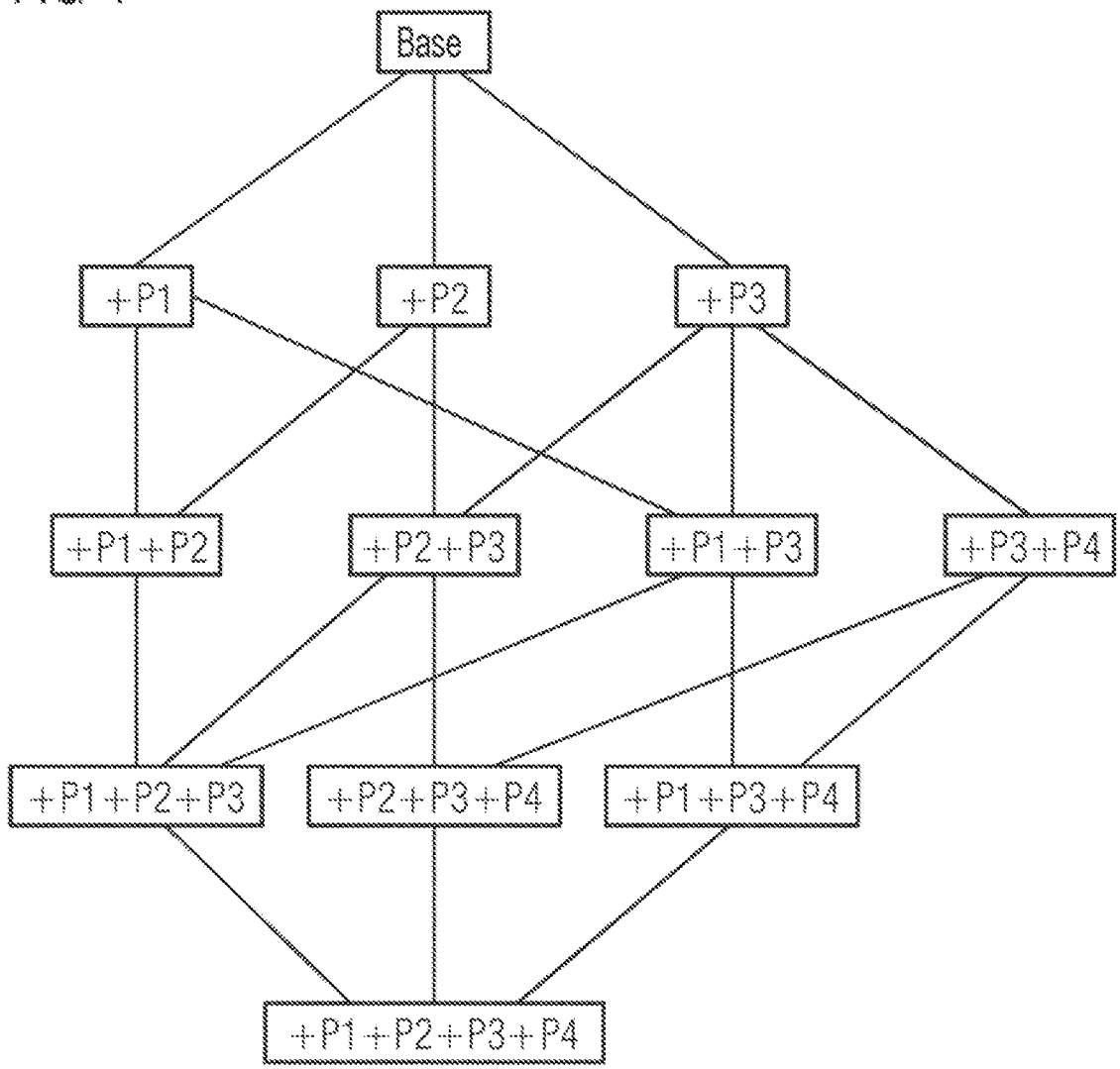

and using a signal connection to provide instructions that correspond to the respective production step for the production module.

22 Claims, 7 Drawing Sheets

(56) References Cited

U.S. PATENT DOCUMENTS

| | | |
|---|---|---|
| 2006/0265257 A1 | 11/2006 | Pulfer |
| 2007/0219656 A1* | 9/2007 | Rothenburg ........... G06Q 10/06 700/97 |
| 2016/0325851 A1* | 11/2016 | Turner .................... B23P 15/00 |
| 2018/0218296 A1 | 8/2018 | Feiten et al. |
| 2019/0129393 A1 | 5/2019 | Feiten et al. |

FOREIGN PATENT DOCUMENTS

| | | |
|---|---|---|
| DE | 10240338 A1 | 9/2003 |
| DE | 102015205173 A1 | 9/2016 |
| EP | 2990894 A2 | 3/2016 |
| WO | WO 2004084103 A1 | 9/2004 |
| WO | WO 2012019614 A1 | 2/2012 |

OTHER PUBLICATIONS

Non-English Chinese Office Action dated Nov. 4, 2020 for Application No. 201780040703.9.

\* cited by examiner

FIG 4

| Skill | Workpiece 1 | Orientation | Workpiece 2 | Orientation | Location |
|---|---|---|---|---|---|
| Select | Chassis | o1 | | | Store |
| Place | Chassis | o1 | | | Mounting |
| Fix | Chassis | o1 | | | Mounting |
| Select | Axle 1 | o1 | | | Store |
| Insert | Chassis | o1 | Axle 1 | o1 | |
| Select | Axle 2 | o1 | | | Store |
| Insert | Chassis | o1 | Axle 2 | o1 | |
| Select | Wheel 1 | o1 | | | Store |
| Insert | Axle 1 | o1 | Wheel 1 | o1 | |
| ... | | | | | |
| Insert | Axle 2 | o1 | Wheel 4 | o1 | |
| Select | Mounting device 1 | o1 | | | Store |
| Insert | Axle 1 | o1 | Mounting device 1 | o1 | |
| ... | | | | | |
| Insert | Axle 2 | o1 | Mounting device 4 | o1 | |
| Release | Chassis | o1 | | | Mounting |
| Select | Chassis | o1 | | | Mounting |
| Place | Chassis | o2 | | | Mounting |
| Fix | Chassis | o2 | | | Mounting |
| Select | Bar | o1 | | | Store |
| Insert | Chassis | o2 | Bar | o1 | |
| Select | Car body | o1 | | | Store |
| Insert | Chassis | o2 | Car body | o1 | |

METHOD AND APPARATUS FOR SHAPING A PRODUCTION PROCESS FOR PRODUCING A PRODUCT MADE UP OF MULTIPLE SUBPRODUCTS

CROSS-REFERENCE TO RELATED APPLICATIONS

This application claims priority to PCT Application No. PCT/EP2017/062735, having a filing date of May 26, 2017, based off of German Application No. 10 2016 211 554.5, having a filing date of Jun. 28, 2016, the entire contents both of which are hereby incorporated by reference.

FIELD OF TECHNOLOGY

The following relates to a method and a device for shaping a production process for producing a product made up of a plurality of subproducts in a production system having a plurality of production modules.

The following also relates to a computer program or a computer program product and a computer-readable medium.

BACKGROUND

Contemporary production systems or production plants for the manufacture or processing of technical products usually have a plurality of specific interacting production modules and are becoming increasingly complex. In a product which is to be produced, to be processed or assembled, a plurality of processing, production, assembly or handling steps are usually carried out, for which a plurality of specialized production modules, such as robots, CNC machines, 3D printers, reactors, burners, heating systems or conveyor belts are provided in the production system. One such product can be, for example, a workpiece or product in various stages of a manufacturing, machining or processing process and, in particular, an initial product, pre-product, intermediate or final product. Composite products are usually produced by assembling multiple pre-products or intermediate products.

It is known to plan and execute production processes for a production system by means of central planning and execution entities. Complex composite products are frequently geometrically modeled by means of so-called CAD systems. The planning of a specific procedural sequence of assembly and processing of the composite products using a complex production system generally also requires a plurality of further user decisions and user interventions, however. In particular, the specialized production modules of a production system often have to be programmed by suitably qualified experts in a module-specific and/or product-specific way.

It is possible to carry out such a planning process with the help of a process-graph representation. In this method, every node corresponds to a process. The nodes are connected to each other by directed or non-directed edges. FIG. 1 shows an example of such a graph. For example, an assembly task is to be performed in which 4 parts P1, P2, P3, P4 are to be integrated or inserted into an object base. The insertion production step P4 can only be carried out if P3 has been inserted. There are no further dependencies. This can be expressed by the processes +P1+P2, +P2+P3, +P1+P3, +P3+P4. In the example this results in 12 nodes and 20 edges.

The disadvantage of this graph structure is the fact that for flexible production processes the number of possible pre-products or intermediate products increases too rapidly, so that the graph is no longer clearly understandable and very difficult to manage.

In document DE 102015205173.0 a method for producing a composite product, and a production module and a production controller have previously been proposed. In this case, in order to produce a composite product comprising multiple subproducts in a production system or production plant comprising multiple production modules, it is proposed to generate a product model data set containing data about production steps to be performed for the product and its subproducts and to assign them to a product instance to be produced. The organization of the assembly steps disclosed therein during the manufacturing of a product deals not only with the actual distributed organization of the production of (sub)products, but also performs a structuring of the assembly process. In the patent application there is no graph structure used for the structuring of the processes.

SUMMARY

An aspect relates to a method for shaping a production process for producing a product made up of a plurality of subproducts in a production system having a plurality of production modules, said method comprising the following steps:
  generating a process model using data about production steps to be carried out for the product and the subproducts thereof,
  from which process model data about at least one production step are read and a respective production module that is available and associated therewith for carrying out the respective production step is identified, and
  using a signal connection to deploy instructions that correspond to the respective production step for the production module,
  wherein the process model is represented by a graph that comprises a plurality of nodes connected by edges, each node describing a process step and the nodes being connected to one another by the edges in such a way that the dependencies that exist between the production steps are expressed by means of the edges.

A graph structure can be generated which is used for the organization of production steps during the production or manufacturing of a product. The arrangement of the edges in the graph can reflect a partial ordering.

According to embodiments of the invention, a minimum and at the same time, complete representation of all possible production processes is provided, wherein individual production steps can be subject to a partial ordering.

If a first edge is ordered prior to a node and a second edge is ordered after the same node, the process step represented by the first edge must be carried out before the process step represented by the second edge. This is referred to as sequential ordering.

In addition, a condition on the pre- and post-ordering of an edge can be either specified by the user, or predefined. According to this condition the first process step must be carried out before the second process step. This is referred to as conditional ordering.

A partial ordering of the (sub-)processes describes whether a production step or (sub-) process can be carried out sequentially before another production step or only conditionally—e.g., only under a specific alignment or orientation of objects or parts to be inserted.

The representation allows a verification and modification of the individual production processes at the level of the individual production steps.

The nature of the process step and the objects required for the production of a subproduct can be specified in the nodes.

The nodes, edges and descriptions of the nodes and edges can be formalized in such a way that the process model is in a machine-readable form. Large production tasks can be automatically structured into sub-tasks by means of suitable graph-based algorithms (e.g. Min-Cut). As a result, the computation times required to find valid production processes using computer-implemented planning tools are reduced.

The process model can be subdivided into sub-process models. The subdivision of the process model into sub-process models can be carried out by means of the Min-Cut algorithm. The subdivision of the process model into sub-process models enables inconsistencies and incompletenesses in the process model to be identified, possibly automatically.

A cut is used in graph theory to designate a non-empty subset of the set of nodes of a graph. A minimum cut (min-cut) exists if after removing the edges of the cut from the graph, exactly two connected components are produced. It can be shown that this is the case only if a set of nodes can be selected such that the cut induced thereby contains no subsets of edges which form a cut induced by a different set of nodes. In other words: a cut is minimal if a subset of the cut does not itself form a cut.

A further aspect of embodiments of the invention is a device designed with means or units for carrying out the method steps described above, which in order to enable interactive use outputs and displays the graph representation described above on an output device, such as a screen or even a mobile tablet.

The device for shaping a production process for producing a product made up of a plurality of subproducts in a production system comprising a plurality of production modules has:
 a generating unit for generating a process model using data about production steps to be carried out for the product and the subproducts thereof,
 from which process model, data about at least one production step can be read out and a respective production module that is available and associated therewith for carrying out the respective production step can be identified, and
 a providing unit for providing instructions via a signal connection that correspond to the respective production step for the production module,
wherein
the process model is represented by a graph which comprises a plurality of nodes connected by edges, each node describing a process step and the nodes being directly and/or indirectly connected to one another by the edges in such a way that the dependencies that exist between the production steps are expressed by means of the edges.

The device can be extended in the same way as the method described above and has the same advantages.

In addition, the device can be coupled to an input device or user interface, or the input device can be integrated in the device. The input device can be used to accept user input to enter, modify, and delete the nodes and edges of the process model. The subdivision of the process model into sub-process models can be carried out using the input device. Different views of the process models and, if appropriate, the sub-process models thereof, can be selected using the input device. The graphical user interface enables sub-graphs of the process graph to be easily restructured: directed edges between nodes of the process graph can be reversed or deleted/added at the touch of a button. This allows a process graph to be decomposed into sub-graphs, which can then be rearranged. In addition, it is possible to combine multiple process graphs into one.

In addition, by selecting a node in the process graph the stored information (e.g. any subproducts or tools required) can be displayed and edited. In this way it is possible to easily adapt or refine a process graph. The graphical display allows the user easy to easily identify whether expected structures, such as symmetries or block formations, are correctly included in the model. This enables inconsistencies and incompletenesses, which can lead to design errors, to be detected. It is possible to present these inconsistencies and incompletenesses to the user automatically, for example, by the use of color.

A further aspect of embodiments of the invention is a technical system for which the production planning is performed. Such a system can be an automation system or a production plant.

The components of such a system can specify the type of system.

The device provides means or units for carrying out the above-mentioned method, which can be characterized either in terms of hardware and/or firmware and/or software, or as a computer program or a computer program product (non-transitory computer readable storage medium having instructions, which when executed by a processor, perform actions).

A further aspect of embodiments of the invention is a computer program product or a computer program having means for carrying out the above-mentioned method if the computer program (product) is executed in an above-mentioned device or in means comprised by the device. The computer program (product) can be stored on a computer-readable medium. The computer program (product) can be written in a commonly used programming language (such as C++, Java). The processing device can comprise a commercially available computer or server with suitable input, output and storage means. This processing device can be integrated in the device, or in the means thereof.

The embodiment has the following additional advantages: a high degree of flexibility in production processes can be by the graph description. This enables (interactively) the efficient addition of new production processes or dependencies in this description at the level of the process steps. In each case only one new node or one new edge needs to be added. For a process node the nature of the process and the parts used can be interactively selected. It is possible to display the intermediate products or the relevant parts of intermediate products. Therefore, the process structure is rendered in a clear and comprehensible form for a user. Overall, the effort and the frequency of errors or planning mistakes is reduced in comparison to the representations involving intermediate products described earlier. In fact, such a graphical representation affects the production process planning, which, in turn, has an impact on the implementation of the process steps in a production system. Thus, errors in the process model, i.e. adverse consequences in the graphs, can give rise to serious disruptions in the real production process.

BRIEF DESCRIPTION

Figures 2, 3:
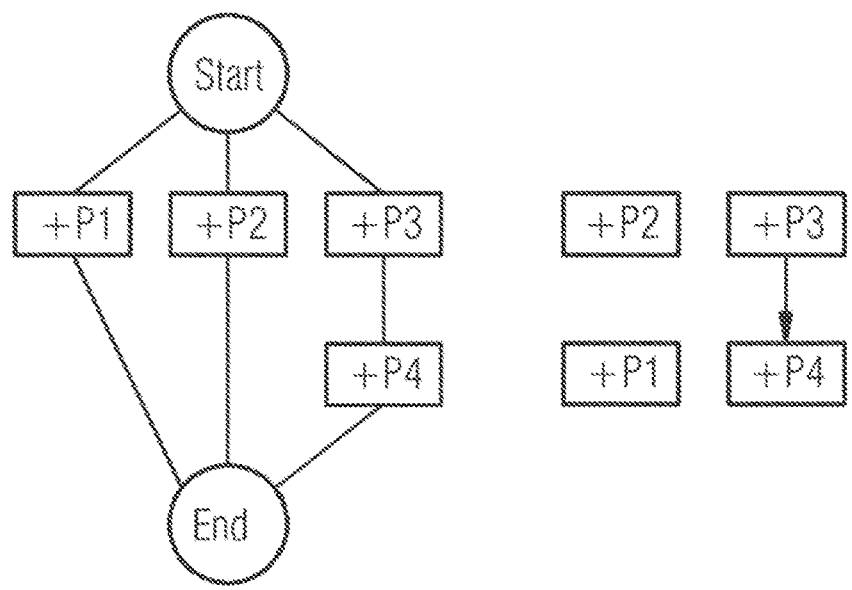

Some of the embodiments will be described in detail, with references to the following Figures, wherein like designations denote like members, wherein:

FIG. 1 the example explained above;

FIG. 2 a graph representation with two process graphs;

FIG. 3 a materials list for an assembly example

FIG. 4 a sequence of assembly capabilities

Figure 5:
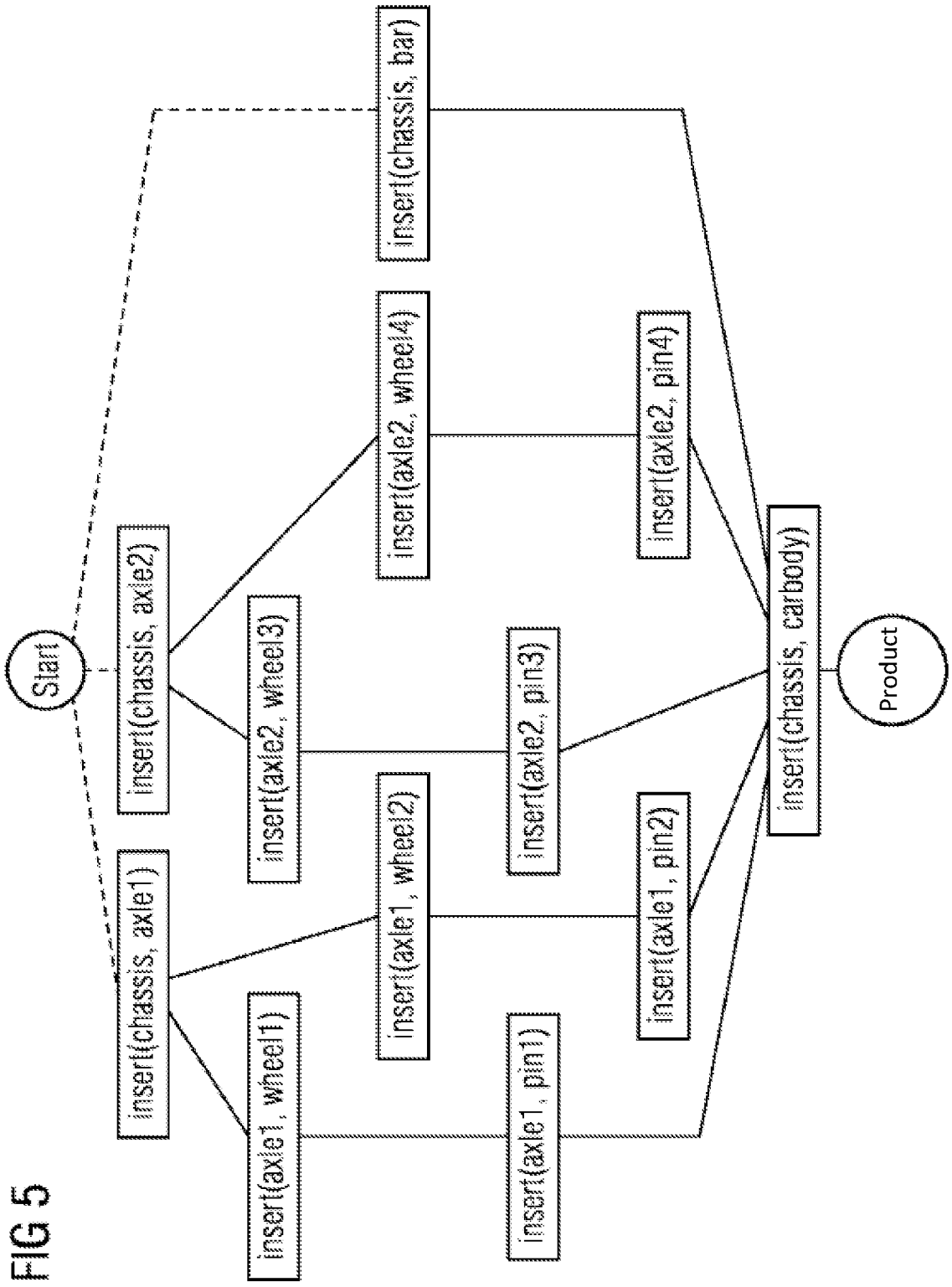

FIG. 5 an example of a process graph for an assembly sequence

Figure 6:
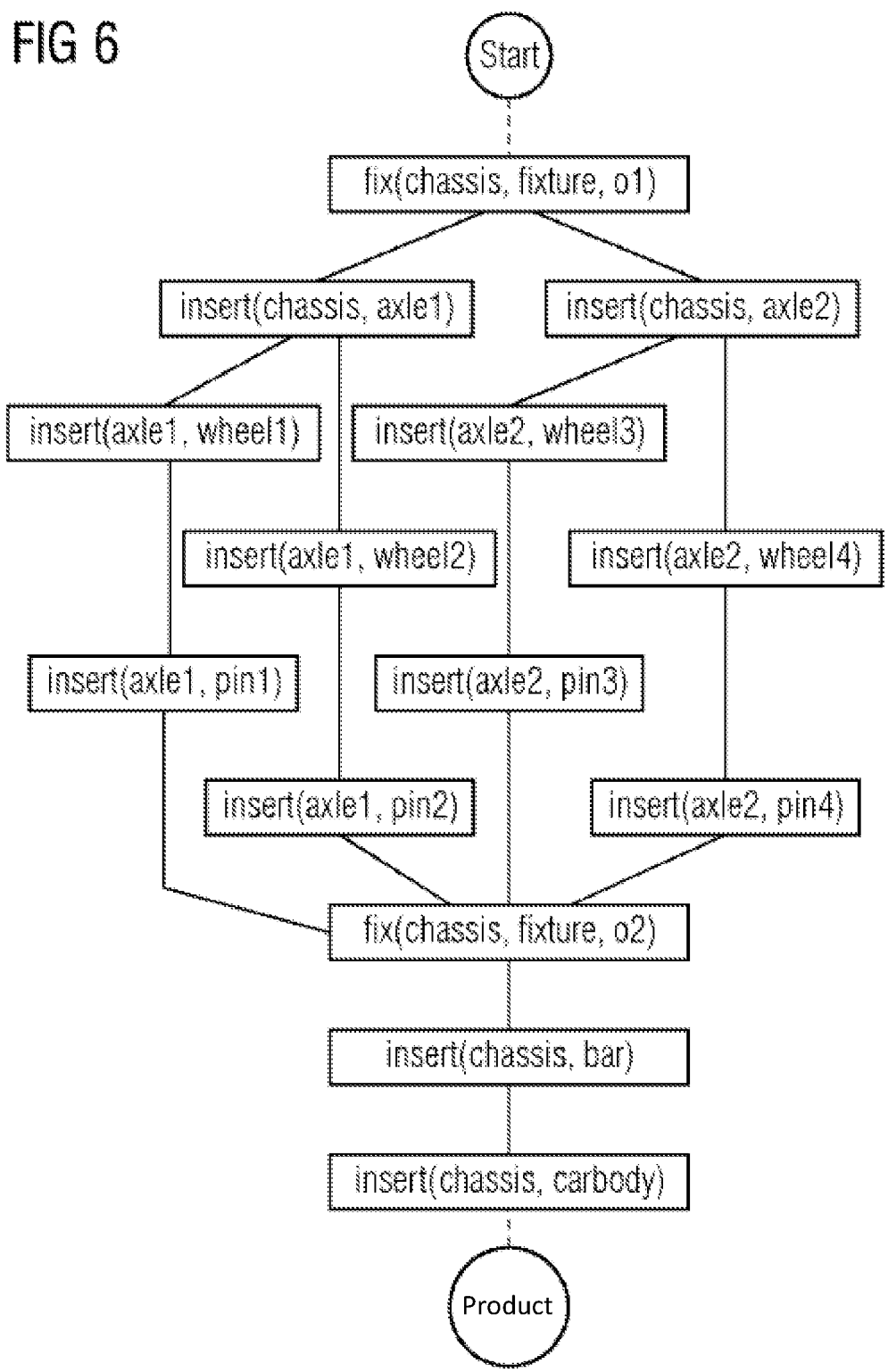
Figure 7:
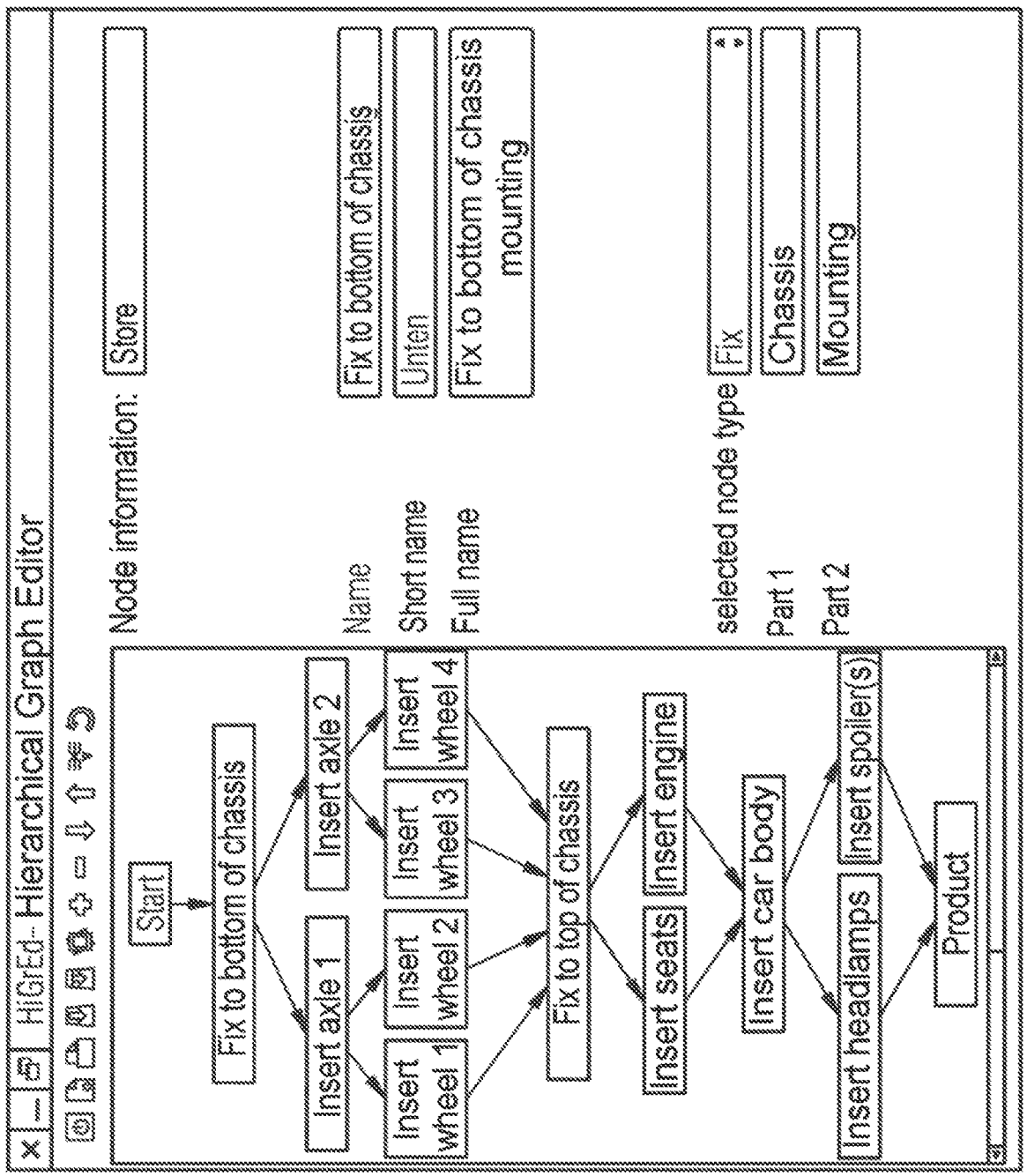
Figure 8:
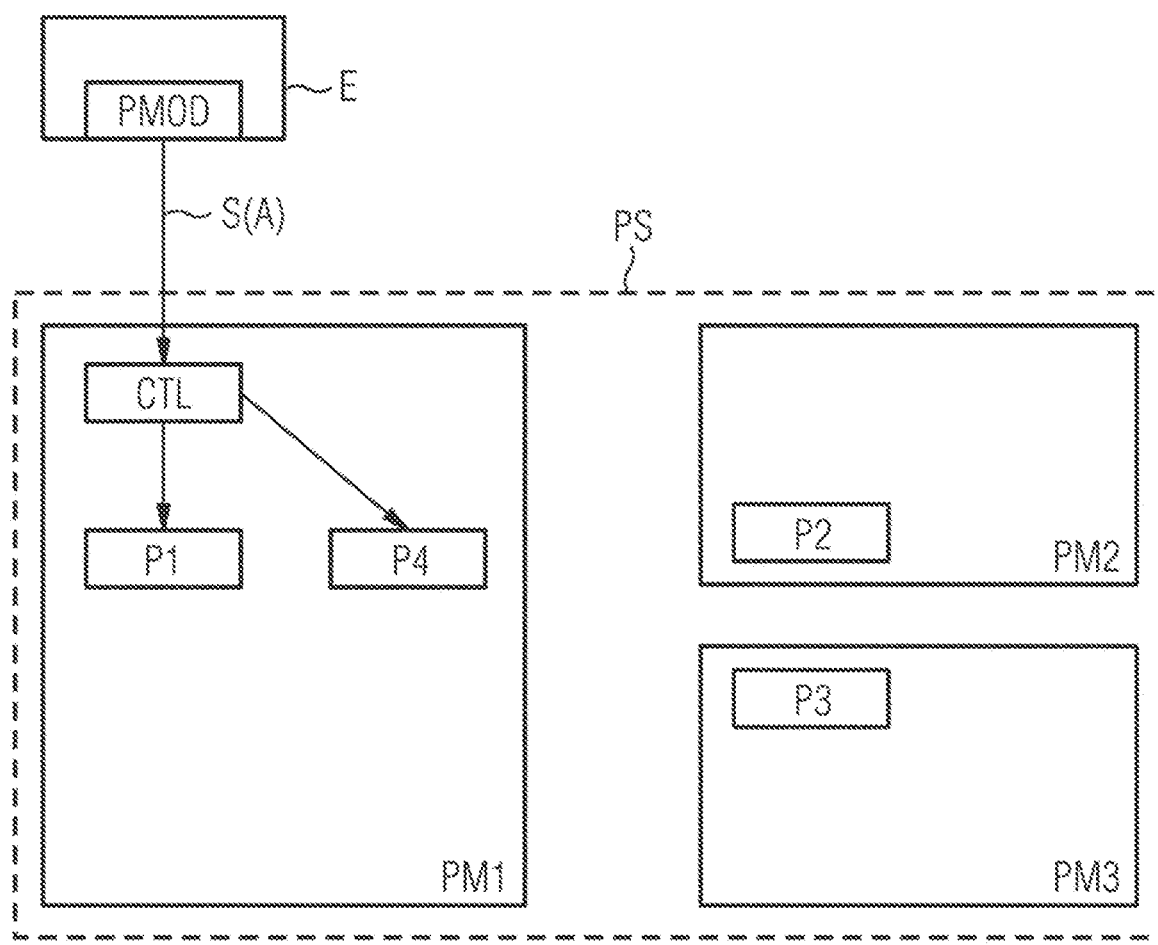

FIG. 6 a further example of a process graph for an assembly sequence, taking into account an additional constraint FIG. 7 an example graph with a user interface as a screenshot (snapshot of the image displayed on-screen); and FIG. 8 illustrates a production system.

DETAILED DESCRIPTION

A production process—for example, for an assembly sequence for a toy car—can be represented in accordance with embodiments of the invention in the form of a graph structure which takes account of the production steps and their dependencies. It is not necessary to specify explicitly the plurality of intermediate products that can be realized in a flexible production system. For production processes with a plurality of steps this gives the user an easily manageable representation, which largely prevents the user from making an error.

In a production plant or in a production system PS, so-called production modules are usually arranged that can carry out the production and/or the control of the production of a product. The product can be composed of several subproducts, including intermediate and end products among others. A process model can be generated, which is used to derive one or more production steps to be executed in a specific order. In addition, via a signal connection S, instructions A are issued to the production module, for example PM1, which initiate the corresponding step in the production.

FIG. 8 illustrates a production system PS with a plurality of production modules, here PM1, PM2 and PM3, for producing a composite product consisting of a plurality of subproducts. The product and its subproducts can be any physical product or subproduct or workpiece in various phases of a production, machining and/or processing process and in particular also an initial product, pre-product, intermediate or end product. The production system PS can be, for example, a manufacturing plant.

Production modules PM1, PM2 and PM3 can be used to represent, in particular, devices of the production system PS, which contribute to the production, machining, assembly, processing and/or handling of the product and/or its subproducts. The production modules PM1, PM2 and PM3 can each have a specific functionality. Examples of this are, in particular, robots, CNC machines, 3D printers, reactors, burners, heating systems and conveyor belts or other transport modules. In particular, the production modules PM1, PM2 and PM3 can be so-called cyber-physical modules or cyber-physical production modules.

The production modules PM1, PM2 and PM3 each contain a production controller CTL, which among other things, controls a sequence of the production of products. In the present exemplary embodiment, the production controller CTL is part of a production module, in this case PM1. PM2 or PM3 can be designed in the same way. Alternatively or additionally, the production controller CTL can also be a centralized or decentralized part of the entire production system PS. A module-specific production controller CTL allows a distributed process control, which in many cases can react very flexibly and quickly to changes in the production process.

The production modules PM1, PM2 and PM3 can carry out production steps P1, P2, P3, P4, for example, provision of material, drilling, grinding, milling, assembly of subproduct instances and/or transport services.

In order to produce the product a process model PMOD is transmitted to a first production module, here PM1, of the production system PS. The process model PMOD is assigned to the product to be produced and comprises a formal semantic description of the production steps, for example P1, P2, P3, P4, to be carried out for the product and its sub-products. On the basis of the process model PMOD, the production controller CTL, which receives corresponding instructions A via a signal connection S from the respective production step P1, initiates a process step P1 or P4. The dependency of whether process step P4 is designed to take place before P1 or, for example, P1 before P4, is specified in the process model PMOD, which is machine-readable. This process model is implemented in the example here as a graph (see, for example, FIG. 6). The graph comprises a plurality of nodes connected by edges, each node describing a process step and the nodes being connected to one another by the edges in such a way that the dependencies that exist between the production steps are expressed by means of the edges.

In the production controller CTL it is also determined, among other things, which production module of the production system PS is available to carry out a respective production step. For this purpose, a respective production step is compared with capabilities of the production modules of the production system PS, and if a production module is suitable, its availability is negotiated, possibly dynamically.

According to embodiments of the invention a device is provided for shaping a production process for producing a product made up of a plurality of subproducts in a production system PS having a plurality of production modules, which device can have:
- a generating unit E for generating a process model using data about production steps to be carried out for the product and the subproducts thereof,
  from which process model, data about at least one production step can be read out and a respective production module that is available and associated therewith for carrying out the respective production step can be identified, and
- a deployment unit, not shown in the figures, wherein the deployment unit can be integrated into the generating unit E, for deploying via a signal connection S appropriate instructions A—in FIG. 8 designated as S(A)—that correspond to the respective production step for the production module,
  wherein the process model is represented by a graph which comprises a plurality of nodes connected by edges, each node describing a process step and the nodes being directly and/or indirectly connected to one another by the edges in such a way that the dependencies that exist between the production steps are represented by means of the edges.

Similarly, the claimed method steps described above, which can be carried out by the device, are provided. In addition, a computer program can be loaded or executed in the device, the commands and/or instructions of which effect the implementation of the claimed method steps.

The device, which is not shown in the figures, can be coupled with the generation unit E or comprise the same.

FIG. 2 shows a possible representation of the above-mentioned graph with two process graphs, wherein each node belongs to a process and the nodes are connected to each other by edges. A central part of this is the partial ordering, i.e., which process must be completed before another process begins. Thus, in the example this graph has only 6 nodes and 7 edges, but at present lacks a connection between the graphs illustrated on the left and right.

The edges in this case can be considered as directed edges, which reproduce the dependencies in the sequence of the individual process steps P1 to P4.

The structured creation of process graphs with the graphical user interface allows the individual process steps to be linked to concepts stored in ontologies. Such structures can then be used to verify that a given process graph is actually feasible. By means of a step-by-step addition of the individual part-ordered or partially ordered process steps it is also possible to identify any node in the process graph, whose upstream and/or downstream process steps are not feasible. Such an automatic verification allows the possible to identify quickly whether individual process steps in the process graph have been incorrectly omitted, or whether a partial ordering specified in the process graph is not feasible. This direct verifiability significantly reduces the susceptibility to errors in the modeling of processes and thus provides a higher level of design safety.

FIG. 3 shows examples of materials or parts to be assembled displayed in the form of a table: wheel 1 to wheel 4, mounting device (pin) 1 to 4, axle 1 and 2, bar, car body. A partial ordering, or dependency, exists in that the car body and the bar are mounted on the chassis from the opposite side to the other parts. The orientation is only implicitly expressed here. Thus, it is specified that an orientation is introduced into the process with orientation information, but the orientation process is not explicitly shown in the graph. In the example it is assumed that each insertion can be accomplished if the chassis is placed on the assembly support in the correct orientation. FIG. 5 therefore illustrates a graph representation without any orientation and FIG. 6 shows a graph representation with the specification of an orientation. FIG. 7 shows a sequence of assembly capabilities. Examples of capabilities (skills) are pick, place, fix, unfix and insert. The columns in the table in FIG. 4 specify the following:
skill, first workpiece or (assembly) part (piece 1), orientation of the first part, second part (piece 2), orientation o2 of the second part and location where the first part is to be located. Locations can be warehouse or storage or else a fixture.

In FIGS. 5 and 6 the assembly processes on the vehicle chassis are represented graphically. In accordance with FIGS. 5 and 6 each process step is a node in the graph and the edges reflect the (partial) ordering (sequentially or conditionally, i.e. subject to a condition), including potential AND/OR relationships. An assembly step is, for example, "Insertion of axis 1 in the chassis", which is expressed in FIGS. 5 and 6 with insert (chassis, axle 1). Other process steps are represented in analogous ways. The number of the nodes and edges in this graph-based representation can be reduced to a minimum and allows to the production structure to be identified without ignoring any production steps or variants.

These graph structures described above are machine readable and therefore suitable for use as the input to appropriate programs/planning tools for production planning. It is possible to use this graph structure as an input variable, for example as a product model (data set), in connection with the above-mentioned method given in DE 102015205173.0.

In addition, information relevant to the production process that is provided by other machines, programs or users before or during the production process takes place can be automatically taken into account in the graph-based representation, since the partial orderings of the process steps enable local changes to be made.

The interactive display also provides the facility to switch between the minimal representation in accordance with embodiments of the invention and a representation based on intermediate products, for example of the kind mentioned above, according to whether the complete graph structure or only parts of it are needed. Thus, compatibility with existing graph-based representations is preserved. This allows on the one hand, existing representations based on intermediate products to be read in, or comparisons to be made with them. On the other hand, a representation of the explicit system states during the production process is possible.

FIG. 7 shows a sample graph with an operator or user interface as a screenshot (snapshot) of a graph editor. The graphical user interface can also be arranged in the generation unit or be coupled thereto. The graphical user interface enables sub-graphs of the process graph to be easily restructured: directed edges between nodes of the process graph can be reversed or deleted/added at the touch of a button. This allows a process graph to be decomposed into sub-graphs, which can then be rearranged. In addition, it is possible to combine multiple process graphs into one. The example graph in FIG. 7 has the process steps "fix to "bottom" of chassis" (Fix Chassis Bottom). Thus, with Insert Axle 1 and Insert Axle 2 the two axes are mounted on the bottom of the chassis, and the wheels (Wheel 1 to 4) are mounted thereafter. On the "upper" chassis (fix Chassis top), the seats and the engine are mounted, and then the body is inserted (insert body). This is followed by the headlights (Flash) and aprons or spoilers.

In addition, by selecting a node in the process graph the stored information (e.g. any subproducts or tools required) can be displayed and edited. In this way it is possible to easily modify or refine a process graph. This graphical display allows the user easy to easily identify whether expected structures, such as symmetries or block formations, are correctly included in the model. Processes or sub-processes that are entered by means of a process graph can additionally be automatically represented in the classical manner with intermediate products. It is also possible to transform processes that were modeled in the classical manner into process graphs. Because the complexity in the representation is thereby minimized, such a transformation allows inconsistencies in the classical model to be detected.

Although embodiments of the invention have been illustrated and described in greater detail by means of the preferred exemplary embodiment, the embodiments of invention is not restricted by the examples disclosed and other variations can be derived therefrom by the person skilled in the art without departing from the scope of protection of embodiments of the invention.

The processes or method sequences described above can be implemented on the basis of instructions which exist on computer-readable storage media or in volatile computer memories (hereafter referred to jointly as computer-readable memories). For example, computer-readable memories can be volatile memories such as caches, buffers or RAM as well as non-volatile memories, such as removable data carriers, hard drives, etc.

The above-mentioned functions or steps can exist in the form of at least one instruction set in/on a computer-readable memory. The functions or steps are not tied to a specific instruction set or to a specific form of instruction sets, or to a specific storage medium or to a specific processor or to specific implementation templates and can be implemented by software, firmware, microcode, hardware, processors, integrated circuits, etc. either in stand-alone operation or in any combination. A wide range of processing strategies can be used, for example, serial processing by a single processor, or multiprocessing or multi-tasking or parallel processing, etc.

The instructions can be stored in local memories, but it is also possible to store the instructions on a remote system and access them via network.

Each of the terms "processor", "central signal processing", "control unit" or "data processing means" or a processor, as used here comprises processing means or processor in the broadest sense, thus for example, servers, universal processors, graphics processors, digital signal processors, application-specific integrated circuits (ASICs), programmable logic circuits such as FPGAs, discrete analog or digital circuits and any combinations thereof, including all other processing resources known to the person skilled in the art or developed in the future. Processors in this context can consist of one or more apparatuses or devices or units. If a processor consists of a plurality of devices, these can be designed and/or configured for parallel or sequential processing or execution of instructions.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for shaping a production process for producing a product made up of a plurality of subproducts in a production system having a plurality of production modules, having the following steps:
   generating a process model using data about production steps to be carried out for the product and the subproducts thereof,
   from which process model at least some of the data about at least one production step are read and a respective production module that is available and associated therewith for carrying out the respective production step is identified and
   using a signal connection to deploy instructions that correspond to the respective production step for the production module,
wherein the process model is represented by a graph that comprises a plurality of nodes connected by edges, each node describing a process step and the nodes being connected to one another by the edges in such a way that sequential dependencies and conditional dependencies that exist between the production steps are expressed by the edges, wherein the sequential dependencies require a process step to be carried out before another process step, and wherein each of the conditional dependencies require a specific alignment or orientation of the subproducts for a process step and for subsequent process steps which are connected to the process step and to each other and which do not have a different conditional dependency.

2. The method as claimed in claim 1, wherein the arrangement of the edges reflects a partial ordering.

3. The method as claimed in claim 1, wherein if a first edge is ordered prior to a node and a second edge is ordered after the same node, the process step represented by the first edge must be carried out before the process step represented by the second edge.

4. The method as claimed in claim 3, wherein in addition to the pre- and post-ordering of an edge, a condition can be specified under which the first process step must be carried out before the second process step.

5. The method as claimed in claim 1, wherein the nature of the process step and the objects required for the production of a subproduct can be specified in the nodes.

6. The method as claimed in claim 1, wherein the nodes, edges and descriptions of the nodes and edges are formalized in such a way that the process model is in a machine-readable form.

7. The method as claimed in claim 1, wherein the process model can be divided into sub-process models.

8. The method as claimed in claim 1, wherein the subdivision of the process model into sub-process models is performed by the Min-Cut algorithm.

9. The method as claimed in claim 7, wherein the subdivision of the process model into sub-process models enables inconsistencies and incompletenesses in the process model to be identified.

10. A device for shaping a production process for producing a product made up of a plurality of subproducts in a production system having a plurality of production modules, having:
   a generating unit for generating a process model using data about production steps to be carried out for the product and the subproducts thereof,
   from which process model data about at least one production step can be read out and a respective production module that is available and associated therewith for carrying out the respective production step can be identified, and
   a deployment unit for deploying instructions via a signal connection that correspond to the respective production step for the production module,
wherein the process model is represented by a graph that comprises a plurality of nodes connected by edges, each node describing a process step and the nodes being directly and/or indirectly connected to one another by the edges in such a way that sequential dependencies and conditional dependencies that exist between the production steps are expressed by the edges, wherein the sequential dependencies require a process step to be carried out before another process step, and wherein each of the conditional dependencies require a specific alignment or orientation of the subproducts for a process step and for subsequent process steps which are connected to the process step and to each other and which do not have a different conditional dependency.

11. The device as claimed in claim 10, wherein the arrangement of the edges reflects a partial ordering.

12. The device as claimed in claim 10, wherein if a first edge is ordered prior to a node and a second edge is ordered after the same node, the process step represented by the first edge must be carried out before the process step represented by the second edge.

13. The device as claimed in claim 12, wherein in addition to the pre- and post-ordering of an edge, a condition can be specified under which the first process step must be carried out before the second process step.

14. The device as claimed in claim 10, wherein the type of process step and the objects required for the production of a subproduct are specified in the nodes.

15. The device as claimed in claim 10, wherein the nodes, edges and descriptions of the nodes and edges are formalized in such a way that the process model is in a machine-readable form.

16. The device as claimed in claim 10, wherein the process model can be divided into sub-process models.

17. The device as claimed in claim 10, wherein the subdivision of the process model into sub-process models can be carried out by the Min-Cut algorithm.

18. The device as claimed in claim 16, wherein the subdivision of the process model into sub-process models enables inconsistencies and incompletenesses in the process model to be identified.

19. The device as claimed in claim 10, wherein the nodes and edges of the process model can be entered, modified and deleted by an input device coupled with the device.

20. The device as claimed in claim 19, wherein the subdivision of the process model into sub-process models can be carried out using the input device.

21. The device as claimed in claim 19, wherein different views of the process models and, if appropriate, the sub-process models thereof can be selected by the input device.

22. A computer program product for carrying out the method as claimed in claim 1, comprising a computer readable hardware storage device having computer readable program code stored therein, said program code executable by a processor of a computer system to implement a method.

* * * * *